(12) United States Patent
Kim et al.

(10) Patent No.: US 6,708,556 B1
(45) Date of Patent: Mar. 23, 2004

(54) ATOMIC FORCE MICROSCOPE AND DRIVING METHOD THEREFOR

(75) Inventors: You Kwang Kim, Seoul (KR); Sang Gook Kim, Seoul (KR); Kyu Ho Hwang, Seoul (KR)

(73) Assignee: Daewoo Electronics Corporation (KR)

( * ) Notice: Subject to any disclaimer, the term of this patent is extended or adjusted under 35 U.S.C. 154(b) by 168 days.

(21) Appl. No.: 10/009,063

(22) PCT Filed: May 31, 2000

(86) PCT No.: PCT/KR00/00564
§ 371 (c)(1),
(2), (4) Date: Dec. 5, 2001

(87) PCT Pub. No.: WO00/75627
PCT Pub. Date: Dec. 14, 2000

(30) Foreign Application Priority Data

Jun. 5, 1999 (KR) .................... 1999-20852
Jun. 5, 1999 (KR) .................... 1999-20854

(51) Int. Cl.[7] .............................. G01B 5/28
(52) U.S. Cl. ............................... 73/105
(58) Field of Search .......................... 73/105

(56) References Cited

U.S. PATENT DOCUMENTS

| | | | | |
|---|---|---|---|---|
| 5,723,775 A | * | 3/1998 | Watanabe et al. | |
| 5,902,928 A | * | 5/1999 | Chen et al. | 73/105 |
| 5,986,262 A | * | 11/1999 | Volcker | 73/105 |
| 6,094,972 A | * | 8/2000 | Yasutake et al. | 73/105 |

* cited by examiner

*Primary Examiner*—Robert Raevis
(74) *Attorney, Agent, or Firm*—Anderson Kill & Olick, PC

(57) ABSTRACT

An atomic force microscope (AFM) capable of observing the topography of a sample surface at high speed with a high resolution under the atmospheric pressure and a driving method therefor is provided. The AFM comprises a light beam source unit, a light beam scanner, a scanning probe unit (or matrix), a light beam detection unit, a driving control unit and a display unit. The driving method comprises the steps of vibrating, responsive to a reference signal, a first actuator provided on each of scanning probes; detecting a deflection amount of a cantilever provided with a tip at its free end; and transmitting a servo signal to a second actuator based on the deflection amount of the cantilever.

35 Claims, 6 Drawing Sheets

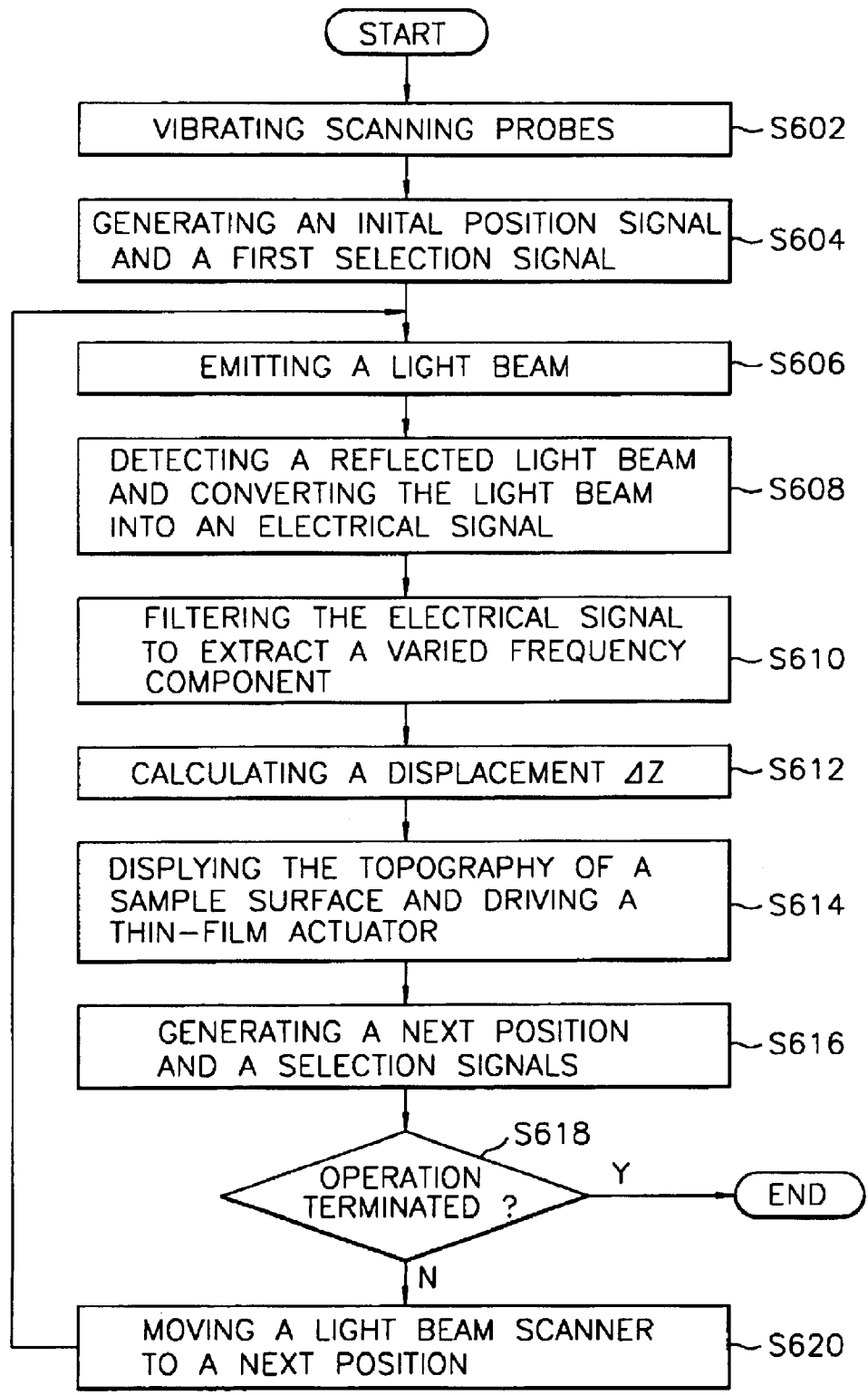

ATOMIC FORCE MICROSCOPE AND DRIVING METHOD THEREFOR

This application is a 371 Application of PCT International Application No. PCT/KR00/00564 filed on May 31, 2000, which designated the United States.

FIELD OF THE INVENTION

The present invention generally relates to an atomic force microscope and a driving method therefor; and, more particularly, to an atomic force microscope equipped with plural scanning probes capable of observing the topography of a sample at high speed with a high resolution under the atmospheric pressure and to a driving method therefor.

DESCRIPTION OF THE PRIOR ART

A variety of techniques have been utilized to observe the topography of a surface, such as the surface of a semiconductor device. A scanning probe microscope such as an atomic force microscope (AFM) is a microscope capable of observing a surface with a high resolution in nanometer or sub-nanometer range without damaging the surface observed by scanning the surface using, as a feedback signal, a signal generated by the inter-atomic force between the surface observed and a tip provided on a scanning probe, while keeping a constant interval between the surface observed and the tip.

U.S. Pat. No. 5,338,932 entitled "METHOD AND APPARATUS FOR MEASURING THE TOPOGRAPHY OF A SEMICONDUCTOR DEVICE" issued to Theodore et al. discloses an apparatus and method for performing a combination of atomic force microscopy and scanning tunneling microscopy measurements to provide an accurate representation of a surface's topography and a material composition. A variable flexibility probe of the apparatus includes a reference element, a variable stiffness element, a support member, a conductive tip and a force element. A first end of the reference element and a first end of the variable stiffness element are attached to the support member so that the reference and the variable stiffness element form two parallel cantilever arms that project from the support member.

The force element is attached to both the reference and the variable stiffness element. The force element applies a variable force to the variable stiffness element in order to vary the stiffness or spring-constant of the variable stiffness element. Although the variable flexibility probe can perform a combination of atomic force microscopy and scanning tunneling microscopy measurements, it would be difficult to downscale the dimension of the variable flexibility probe in order to construct a system employing a plurality of the variable flexibility probes, since the variable flexibility probe is made of two parallel cantilever arms separated from each other with a small gap and including the force element therebetween.

U.S. Pat. No. 5,468,959 entitled "SCANNING PROBE MICROSCOPE AND METHOD FOR MEASURING SURFACES BY USING THIS MICROSCOPE" issued to Tohda et al. discloses a scanning probe microscope of advanced functions combining atomic force microscopy and scanning tunneling microscopy equipped with an active cantilever and a method for observing surfaces by using this microscope. This microscope may be operated at the atmospheric pressure, however, it will be preferable to place this microscope in a super-high vacuum if a measurement for obtaining detailed information of a clean sample surface is required. While this microscope has an advantage capable of being operated under the atmospheric pressure, it would be difficult to downscale the dimension of a scanning probe employed in the microscope since the scanning probe has a large structure for varying a stiffness or spring-constant of the scanning probe as similar to the one by Theodore et al.

U.S. Pat. No. 5,723,775, entitled "ATOMIC FORCE MICROSCOPE UNDER HIGH SPEED FEEDBACK CONTROL" issued to Watanabe et al. discloses an atomic force microscope (AFM) capable of performing a high-speed feedback control achieved by decreasing the mass of a cantilever including an axial driving actuator while eliminating drawbacks caused by the decrease in mass. The AFM scans the structure of a sample to be observed while keeping the constant interval between the surface of the sample and a tip provided on a scanning probe. However, an image representing the topography of the sample surface will be degraded when the tip is contaminated by impurities, e.g., dusts, drops of water and the like which may exist on the surface of the sample observed under the atmospheric pressure.

As described above, none of the aforementioned patents teach a system with plural scanning probes and a driving method therefor capable of observing the topography of a sample surface. When a system employing plural scanning probes is constructed by employing one of techniques described in the aforementioned patents, it will end up to be an expensive and bulky system. Therefore, it is desirable to provide a system, which is inexpensive and of a compact size, with plural scanning probes and a driving method therefor in order to observe the topography of a sample surface at high speed with a high resolution under the atmospheric pressure.

SUMMARY OF THE INVENTION

It is, therefore, an object of the present invention to provide an atomic force microscope capable of observing the topography of a sample at high speed with a high resolution under the atmospheric pressure and a driving method therefor.

In accordance with one aspect of the present invention, there is provided an atomic force microscope (AFM) capable of observing the topography of a sample surface at high speed with a high resolution under the atmospheric pressure, comprising: a plurality of scanning probes for measuring the sample surface, wherein each of the scanning probes includes a cantilever having a tip and a first and a second actuator; means for detecting a light beam reflected from said each of the scanning probes to convert same into a first signal depending on a second signal; and means for driving the scanning probes by generating a third and a fourth signal and detecting information regarding the topography of the sample surface, wherein the first actuator performs a tapping operation in response to the third signal, the second actuator performs a positioning operation in response to the fourth signal and the frequency of the third signal is higher than that of the fourth signal.

In accordance with another aspect of the present invention, there is provided an atomic force microscope capable of observing the topography of a sample surface at high speed with a high resolution under the atmospheric pressure, comprising: a scanning probe matrix having N×M scanning probes thereon for measuring the sample surface, wherein each of the scanning probes includes a cantilever having a tip and a first and a second actuator, N and M being positive integers greater than 1, respectively; means for detecting a light beam reflected from said each of the scanning probe's to convert same into an electrical signal; and means for driving the scanning probes by generating a reference and a servo signal and detecting information regarding the topography of the sample surface, wherein the first actuator performs a tapping operation in response to the reference signal, the second actuator performs a positioning operation in response to the servo signal and the frequency of the reference signal is higher than that of the servo signal.

In accordance with still another aspect of the present invention, there is provided a method for driving an atomic force microscope (AFM) with plural scanning probes capable of observing the topography of a sample surface at high speed with a high resolution under the atmospheric pressure, comprising the steps of: a) vibrating, responsive to a reference signal, a first actuator provided on each of the scanning probes; b) detecting a deflection amount of a cantilever provided with a tip at its free end; and c) transmitting a servo signal to a second actuator based on the deflection amount of the cantilever, wherein the cantilever provided on said each of the scanning probes and the first and second actuator are provided on the cantilever opposite to the free end where the tip is provided.

BRIEF DESCRIPTION OF THE DRAWINGS

The above and other objects and features of the present invention will become apparent from the following description of preferred embodiments given in conjunction with the accompanying drawings, in which:

FIG. 6 is a flow chart for explaining the driving operation of the AFM in accordance with the present invention.

DETAILED DESCRIPTION OF THE PREFERRED EMBODIMENTS

Preferred embodiments of the present invention will be described with reference to FIGS. 1 to 6, which are given by way of illustration only and are not to be considered as limiting the present invention.

Figure 1:
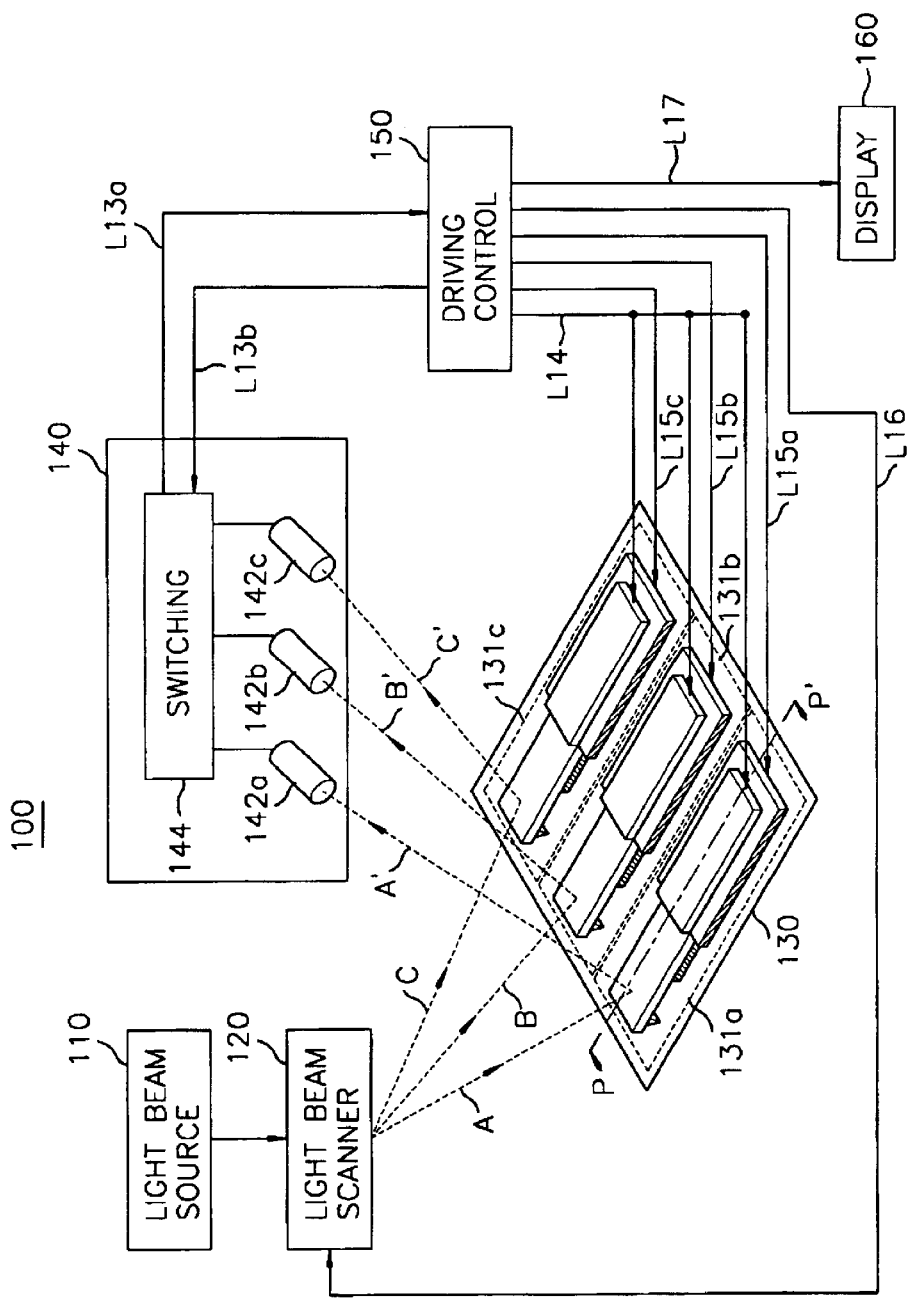
FIG. 1 illustrates a schematic diagram of an atomic force microscope (AFM) capable of observing the topography of a sample surface in accordance with the present invention.

Referring to FIG. 1, there is illustrated a schematic block diagram of an atomic force microscope (AFM) 100 with plural scanning probes in accordance with the present invention, wherein the AFM 100 is capable of observing the topography of a sample surface at high speed with a high resolution under the atmospheric pressure. As shown in FIG. 1, the AFM 100 comprises a light beam source unit 110, a light beam scanner 120, a scanning probe unit 130, a light beam detection unit 140, a driving control unit 150 and a display unit 160.

The light beam source unit 110 emits a light beam, preferably, e.g., a laser beam, to the light beam scanner 120. The light beam source unit 110 may include, e.g., a laser diode (LD), a light emitting diode (LED), or the like. The light beam scanner 120 is mechanically connected to a supporting member (not shown) and is electrically connected through a line L16 to the driving control unit 150. The light beam scanner 120 receives the light beam emitted from the light beam source unit 110 to sequentially perform a scanning operation through a light scanning path A, B, or C on a corresponding scanning probe 131a, 131b, or 131c of the scanning probe unit 130, in response to a position signal provided through a line L16 from the driving control unit 150.

The scanning probe unit 130 includes three scanning probes 131a, 131b and 131c, each of which is electrically connected to the driving control unit 150 through a common line L14 and a line L15a, L15b, and L15c, respectively. For the sake of simplicity, it is illustrated that the scanning probe unit 130 is made of three scanning probes 131a to 131c only, but those skilled in the art will well understand that the scanning probe unit 130 may be made of plural scanning probes, if necessary. The scanning probe unit 130 reflects the light beam emitted from the light beam source unit 110 through a light reflection path A', B', or C' to the light beam detection unit 140.

The light beam detection unit 140 is electrically connected through lines L13a and L13b to the driving control unit 150. The light beam detection unit 140 may be made of a switching block 144 and three photo-detectors 142a to 142c, the number of the photo-detectors being same as the number of the scanning probes 131a to 131c. Each photo-detector is electrically connected to the switching block 144. Each of photo-detectors 142a to 142c includes an electrical signal amplifier (not shown) and converts the light beam reflected by the scanning probe unit 130 into a corresponding electrical signal to amplify it to a predetermined signal level by using the electrical signal amplifier. The display unit 160 is electrically coupled to the driving control unit 150.

Figure 2:
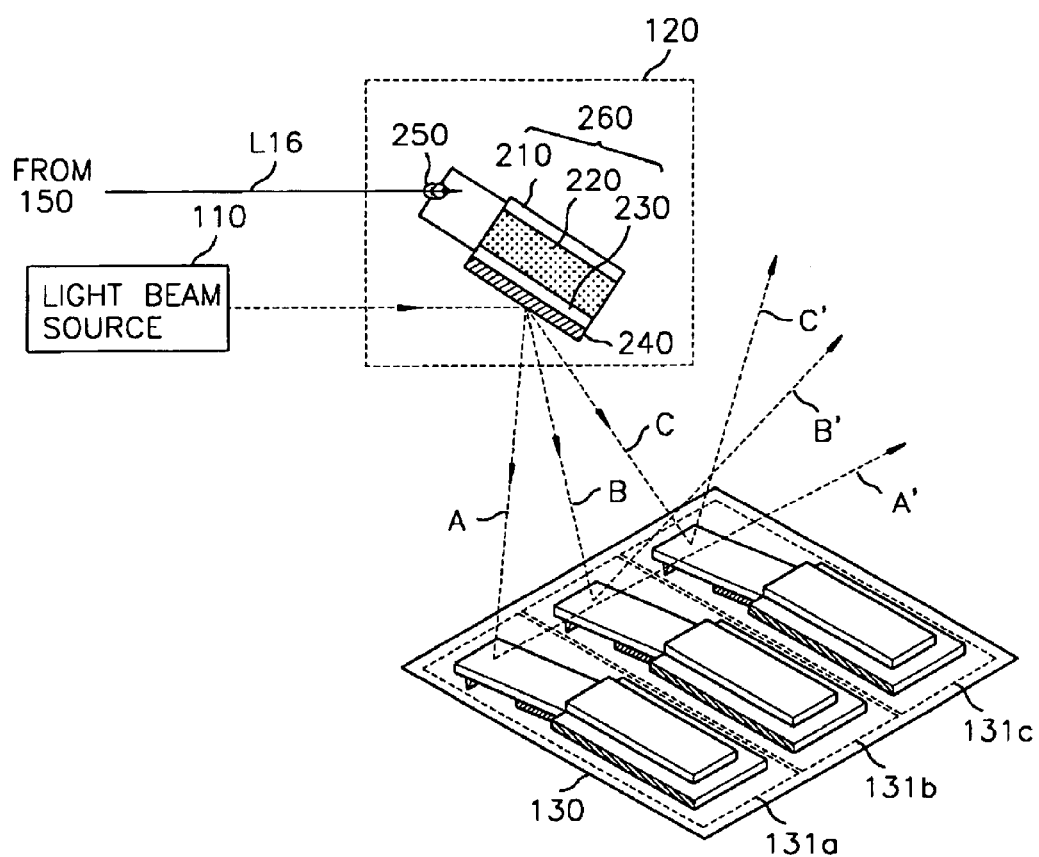
FIG. 2 shows a detailed diagram of a light beam scanner shown in FIG. 1.

Referring to FIG. 2, there is shown a detailed diagram of the light beam scanner 120 illustrated in FIG. 1. As shown in FIG. 2, the light beam scanner 120 includes a first electrode 210, an electro-displacive layer 220, a second electrode 230, a total mirror 240 and a variable voltage source 250. The electro-displacive layer 220 is inserted between the first electrode 210 and the second electrode 230. The total mirror 240 is deposited on the second electrode 230, opposite to the electro-displacive layer 220. The variable voltage source 250, responsive to the position signal inputted thereto, provides the first and second electrode 210 and 230 with a predetermined voltage in accordance with the position signal level. As well known in the art, the electro-displacive layer 220 may be deflected depending on a voltage level supplied to the first and second electrode 210 and 230. In other words, by changing the voltage level inputted to the first and second electrode 210 and 230, the scanning angle of the light beam incident to the total mirror 240 can be varied to allow the light beam to propagate through one of the light scanning paths A, B and C. Such operation will be apparent to the skilled person in the art. For example, if the light beam scanned by the light beam scanner 120 propagates through the light scanning path A, the light beam is reflected by the scanning probe 131a of the scanning probe unit 130 to be transmitted to the photo detector 142a of the light beam detection unit 140 through the light reflection path A'. Otherwise, the light beam will be reflected by the scanning probe 131b or 131c to be transmitted to the photo-detector 142b or 142c of the light beam detection unit 140 through the light reflection path B' or C'.

Figure 3:
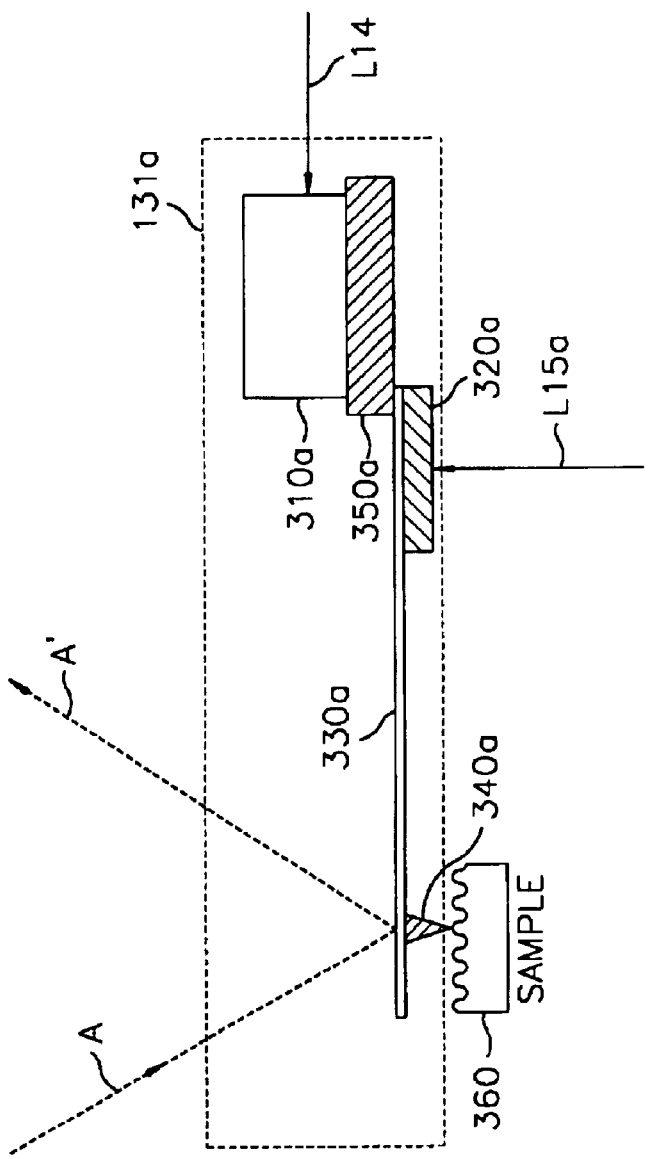
FIG. 3 represents a cross-sectional view of a scanning probe of one preferred embodiment taken along a dotted line P–P' shown in FIG. 1.

Referring to FIG. 3, there is illustrated a cross-sectional view of the scanning probe 131a of the scanning probe unit 130 taken along a dotted line P–P' shown in FIG. 1. The structures of the scanning probes 131a to 131c of the scanning probe unit 130 are identical to each other. The scanning probe 131a is made of a bulk-type actuator 310a, a thin-film actuator 320a, a cantilever 330a, a tip 340a and a fixing member 350a placed between the bulk-type actuator 310a and the cantilever 330a, wherein the fixing member 350a is attached to a supporting frame or substrate (not shown). The bulk-type actuator 310a and the thin-film actuator 320a may be fabricated as well-known structure in which an electro-displacive material is inserted between two electrodes receiving an external signal. The electro-displacive material may be deflected depending on the external signal level provided to the two electrodes.

A sample 360 is held on a fine adjustment stage (not shown) capable of independently being driven in X-, Y- and/or Z-axis directions. For the sake of simplicity, the detailed description of the fine adjustment stage operation will be omitted. The cantilever 330a is disposed above the fine adjustment stage.

The tip 340a, which can be made by employing various techniques well known in the art, is provided on a free end of the cantilever 330a and can be shifted in a normal direction, i.e., Z-axis direction, with respect to the surface of the sample 360 depending on the inter-atomic force (so-called as the Van der Waals' force) between the surface of the sample 360 to be observed and the tip 340a.

Opposite to the free end, the thin-film actuator 320a is integrated on the cantilever 330a. The thin-film actuator 320a may be fabricated together with the cantilever 330a. The thin-film actuator 320a serves to perform a positioning operation in response to a servo signal provided through a line L15a from the driving control unit 150. The positioning operation is to restore a deflection state of the cantilever 330a to an equilibrium state thereof at a measurement point of the sample surface, after the cantilever 330a is deflected in the Z-axis direction at the measurement point by the inter-atomic force between the tip 340a and the sample surface to be observed. The equilibrium state of the cantilever 330a is a non-deflection state thereof without affecting the current position of the cantilever 330a at the measurement point. The positioning operation will prevent the cantilever 330a from being extremely deflected, which may result in a cracking thereof.

The bulk-type actuator 310a is placed on the fixing member 350a. Alternatively, the bulk-type actuator 310a may be directly integrated on the cantilever 330a. In this case, the bulk-type actuator 310a will also play the role of the fixing member 350a. The bulk-type actuator 310a serves to allow the cantilever 330a to perform a tapping operation. The tapping operation is an operation in which the tip 340a provided on the free end of the cantilever 330a periodically comes in contact with and then off the surface of the sample 360 to be observed with a constant time period. In order to allow the cantilever 330a to perform the tapping operation, the bulk-type actuator 310a, responsive to a reference signal transmitted through a line L14 from the driving control unit 150, vibrates in the Z-axis direction with a same frequency as that of the reference signal, wherein the frequency of the reference signal is preferably, e.g., several hundreds kHz. Such operation is also referred to as, e.g., a tapping mode. The tapping mode is known as an intermediate mode between a contact mode and a non-contact mode. The contact mode is a state in which the tip 340a comes in contact with the sample surface, whereas the non-contact mode is a state in which the tip 340a is off the sample surface.

When the bulk-type actuator 310a vibrates in the Z-axis direction, the fixing member 350a vibrates in the same direction with the same frequency as the bulk-type actuator 310a. When the fixing member 350a vibrates, the cantilever 330a fixed thereon also vibrates so that the tip 340a vibrates in the Z-axis direction with the same frequency as the bulk-type actuator 310a. When impurities, e.g., dusts, water and the like, which may exist on the sample surface, stick to the tip 340a under the atmospheric pressure, the cantilever 330a in the tapping mode can remove them from the tip 340a. In other words, by employing the tapping mode, an image representing the topography of the surface of the sample 360 to be observed can be accurately obtained by removing the influence of the impurities degrading the quality of the image.

Figure 4:
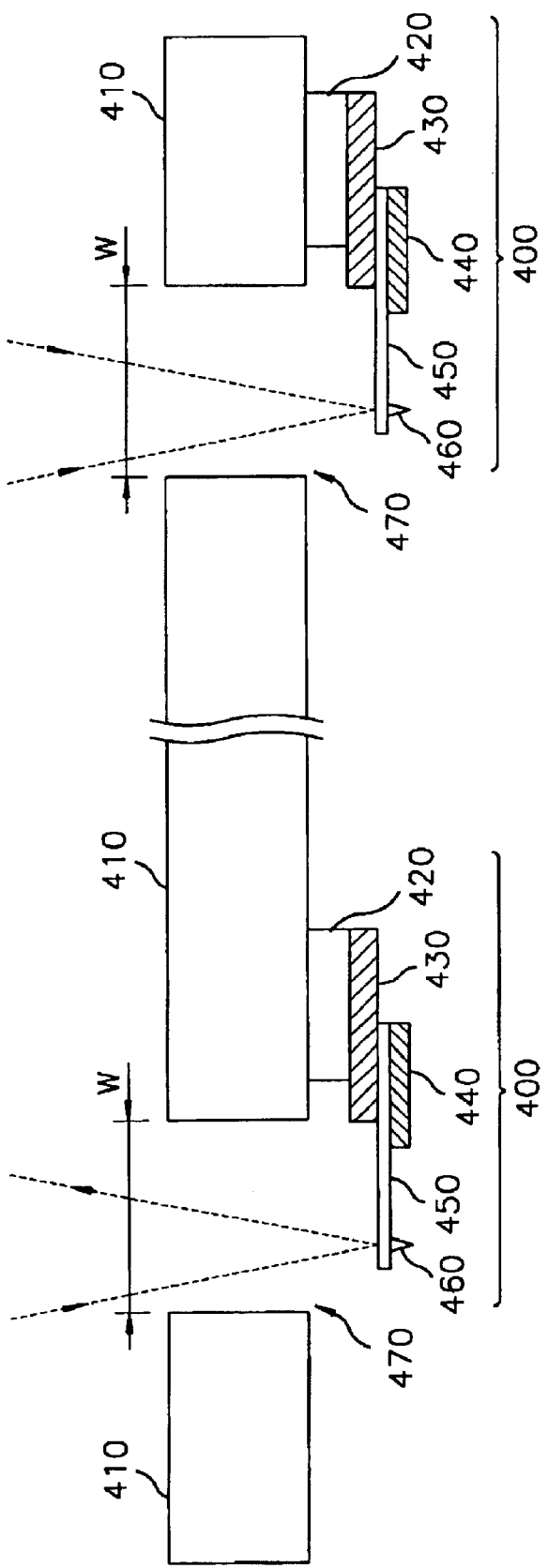
FIG. 4 depicts a cross-sectional view of a scanning probe unit of another preferred embodiment in accordance with the present invention.

Referring to FIG. 4, there is illustrated a cross-sectional view of a scanning probe unit 490 in accordance with another preferred embodiment of the present invention. The scanning probe unit 490 includes a supporting frame or substrate 410, a multiplicity of openings 470 and a plurality of scanning probes 400. The scanning probes 400 are arranged with N×M matrices, N and M being positive integers greater than 1, respectively. The width W of the opening 470 is determined by the incident and reflection angle of the light beam emitted from the light beam source 110. Each scanning probe 400 contains a fixing member 420, a bulk-type actuator 430, a thin-film actuator 440, a cantilever 450 and a tip 460. Comparing to the scanning probe 131a shown in FIG. 3, the positions of the fixing member 420 and the bulk-type actuator 430 are reversed. However, the function and operation of the components included in the scanning probe 400 are identical to that of the components included in the scanning probe 131a shown in FIG. 3. By using the scanning probe unit 490, the operator will observe the topography of the sample surface in an easy and simple manners.

Figure 5:
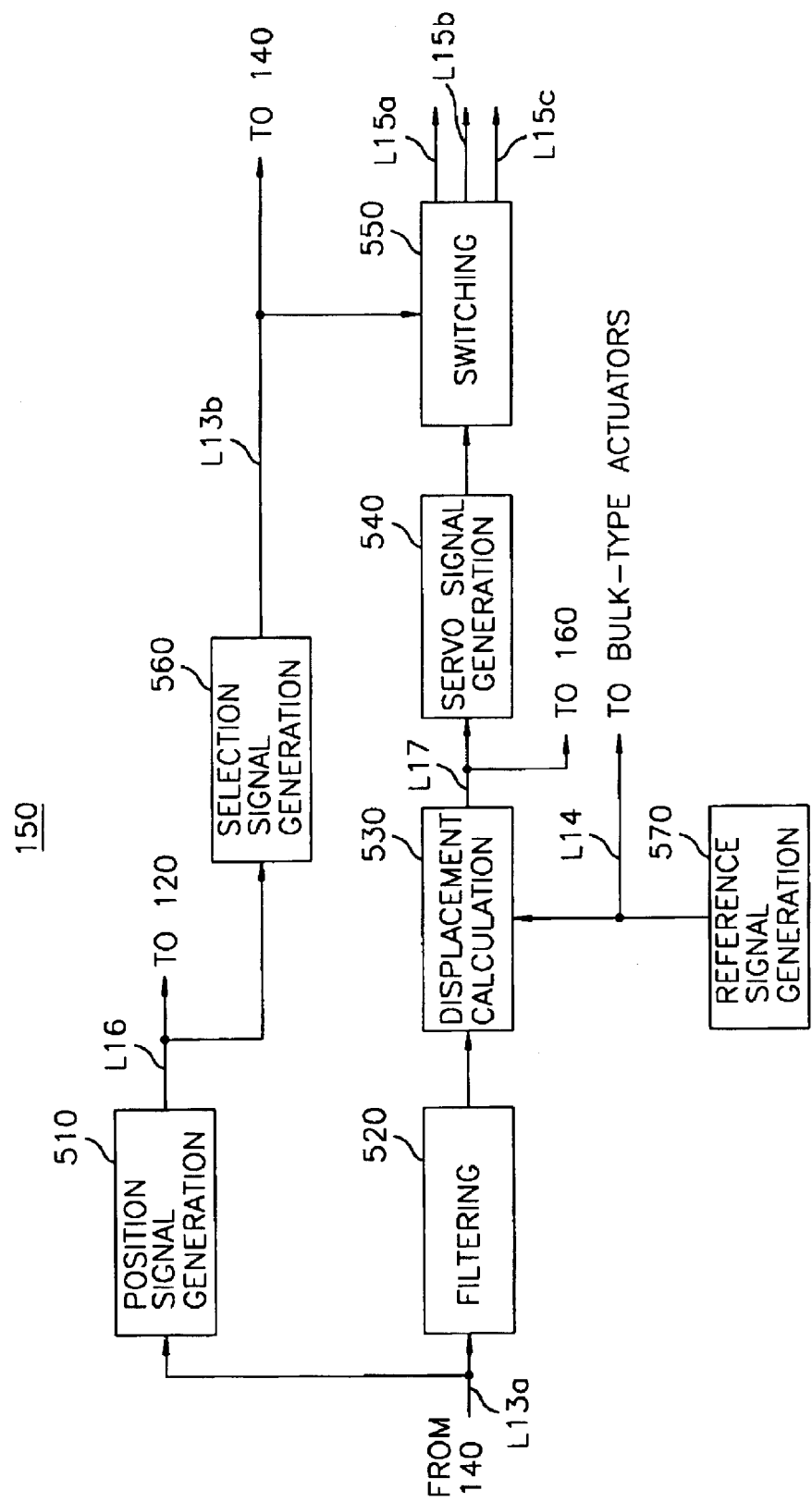
FIG. 5 exemplifies a block diagram of a driving control unit shown in FIG. 1.

Referring to FIG. 5, there is illustrated a detailed diagram of the driving control unit 150 shown in FIG. 1 in accordance with the present invention. As shown in FIG. 5, the driving control unit 150 includes a position signal generation block 510, a filtering block 520, a displacement calculation block 530, a servo signal generation block 540, a switching block 550, a selection signal generation block 560 and a reference signal generation block 570.

The reference signal generation block 570 generates the reference signal to provide it through the line L14 to the displacement calculation block 530 and each of the bulk-type actuators 310a, 310b and 310c employed in the respective scanning probes 131a, 131b and 131c shown in FIG. 3. As described above, in response to the reference signal, the bulk-type actuators 310a, 310b and 310c allow the scanning probes 131a, 131b and 131c to perform the tapping operation.

The position signal generation block 510 detects the amplified signal transmitted through the line L13a from the light beam detection unit 140 shown in FIG. 1. For example, if the amplified signal is not detected, i.e., being at an initial state, the position signal generation block 510 generates an initial position signal to provide it through a line L16 to the light beam scanner 120 shown in FIG. 1, in order to change the scanning position of the light beam scanner 120 to a first position corresponding to the initial state. The first position is the position in which the light beam scanner 120 scans the light beam from the light beam source unit 110 to the scanning probe 131a, i.e., a first scanning probe of the scanning probe unit 130. It is noted that the scanning probes 131a, 131b and 131c are respectively referred to as the first, second and third scanning probe. Also, the position signal generation block 510 provides the initial position signal to the selection signal generation block 560 through the line L16.

In response to the initial position signal, the selection signal generation block 560 generates a first selection signal to transmit it through the line L13b to the switching block 144 of the light beam detection unit 140 and the switching block 550. The switching block 144 of the light beam detection unit 140 selects the first photo-detector 142a in response to the first selection signal. The switching block 550 also selects a line L15a connected to the first scanning probe 131a in response to the first selection signal, wherein the selected line L15a provides a servo signal generated in the servo signal generation block 540 to the thin-film actuator 320a of the first scanning probe 131a.

The filtering block 520 may include a high-pass and low-pass filter (not shown) arranged in parallel. Alternatively, the filtering block 520 may include circuits and/or devices capable of filtering the amplified signal inputted from the light beam detection unit 140. The filtering block 520 cuts off a frequency component corresponding to that of the reference signal contained in the amplified signal provided through the line L13a to pass the remaining frequency component differing from the cut-off frequency component, i.e., a varied frequency component, contained in the amplified signal.

When the amplified signal is provided, the filtering block 520 filters the amplified signal to extract only a varied frequency component thereof. The extracted frequency component includes information concerning the deflection of the cantilever 330a caused by the inter-atomic force between the surface of the sample 360 to be observed and the tip 340a and is transmitted to the displacement calculation block 530. The displacement calculation block 530 calculates a displacement $\Delta z$ corresponding to the deflection amount of the cantilever 330a which varies depending on the inter-atomic force based on the frequency component of the reference signal and the extracted frequency component from the filtering block 520.

In other words, the displacement calculation block 530 calculates a frequency difference between the frequency component of the reference signal and the extracted frequency component, wherein the calculated frequency difference is directly related to the deflection amount of the cantilever 330a caused by the inter-atomic force between the tip 340a and the surface of the sample 360 to be observed. The calculated frequency difference is then provided through a line L17 to the servo signal generation block 540 and the display unit 160 shown in FIG. 1.

Depending on the calculated frequency difference, the servo signal generation block 540 generates the servo signal to drive the thin-film actuator 320a of the first scanning probe 131a for allowing the cantilever 330a to perform the positioning operation, as described above. The servo signal is then transmitted to the thin-film actuator 320a through the line L15a already selected by the first selection signal.

Referring back to FIG. 1, the display unit 160 may include, e.g., a computer reconstructing a two- or three-dimensional image representing the topography of the surface of the sample 360 to be observed based on the calculated frequency difference provided through the line L17 from the displacement calculation block 530 shown in FIG. 4, and a monitor capable of displaying the reconstructed image thereon. It should be noted that the operation sequence of the driving control unit 150 has been described in association with the first scanning probe 131a of the scanning probe unit 130 but that of the driving control unit 150 associated with the remaining scanning probes of the scanning probe unit 130 is similar.

Now, the detailed description of the driving operation of the AFM in accordance with the present invention will be described with reference to FIG. 6.

At step S602, the reference signal generation block 570 shown in FIG. 4 provides the reference signal through the line L14 to the bulk-type actuators 310a, 310b and 310c and the displacement calculation block 530. And, in response to the reference signal, the bulk-type actuators 310a, 310b and 310c vibrate with the same frequency as the reference signal. Thus, as described above, the cantilevers 330a, 330b and 330c operate in the tapping mode so that the respective tips 340a, 340b and 340c provided on the corresponding cantilevers 330a, 330b and 330c vibrate with the same frequency as the bulk-type actuators 310a, 310b and 310c.

At step S604, the position signal generation block 510 generates an initial position signal to provide it to the light beam scanner 120 and the selection signal generation block 560 through the line L16. In response to the initial position signal, the light beam scanner 120 is put to a first position. Then, the selection signal generation block 560, responsive to the initial position signal, generates a first selection signal to transmit it to the switching block 144 of the light beam detection unit 140 shown in FIG. 1 and the switching block 550 illustrated in FIG. 4 through the line L13b. Thereafter, the switching block 144 selects the first photo-detector 142a for detecting a reflected light beam from the first scanning probe 131a. Also, the switching block 550 chooses the line L15a for providing the thin-film actuator 320a with the servo signal generated in the servo signal generation block 540.

At step S606, the light beam source unit 110 emits the light beam, preferably, e.g., a laser beam, on the light beam scanner 120. Then, the light beam scanner 120 located at the initial position scans the light beam through the light scanning path A shown in FIG. 1 on the tip portion of the cantilever 330a of the first scanning probe 131a. The cantilever 330a of the first scanning probe 131a reflects the light beam to direct it to the first photo-detector 142a of the light beam detection unit 140 through the light reflection path A'.

At step S608, the first photo-detector 142a detects the reflected light beam provided thereto and converts same into a corresponding electrical signal. The electrical signal is then amplified to a predetermined signal level by the electrical signal amplifier employed in the first photo-detector 142a. The amplified signal is provided through the line L13a to the filtering block 520 and the position signal generation block 510 of the driving control unit 150.

At step S610, the filtering block 520 filters the amplified signal to extract a varied frequency component thereof. As described above, the extracted frequency component includes information regarding the deflection of the cantilever 330a of the first scanning probe 131a, wherein the extracted frequency component may be higher or lower than the frequency component of the reference signal used to vibrate the cantilever 330a of the first scanning probe 131a. Then, the extracted frequency component is provided from the filtering block 520 to the displacement calculation block 530.

At step S612, the displacement calculation block 530 computes the displacement $\Delta z$, which is directly related to the deflection amount of the cantilever 330a of the first scanning probe 131a in the Z-axis direction, by calculating a frequency difference between the frequency component of the reference signal from the reference signal generation block 570 and the extracted frequency component from the filtering block 520. Then, the displacement calculation block 530 provides the computed displacement Δz through the line L17 to the servo signal generation block 540 and the display unit 160 shown in FIG. 1.

At step S614, the servo signal generation block 540 generates a servo signal based on the computed displacement Δz to transmit it to the switching block 550 which provides the servo signal to the thin-film actuator 320a of the first scanning probe 131a through the line L15a already selected in response to the first selection signal. The servo signal drives the thin-film actuator 320a of the first scanning probe 131a for allowing the cantilever 330a thereof to restore it to its equilibrium state at this measurement point without changing its current position. The frequency of the servo signal may be, preferably, e.g., several tens of kHz. Also, the display unit 160 displays thereon the image of, e.g., 2- or 3-dimensional, representing the topography of the observed sample surface based on the computed displacement Δz.

At step S616, the position signal generation block 510, in response to the amplified signal as the signal inputted to the filtering block 520 at step S610, generates a next position signal to provide it to the selection signal generation block 560 and the light beam scanner 120 through the line L16. The selection signal generation block 560 generates a second selection signal to transmit it to the switching block 550 and the light beam detection unit 140 through the line L13b. Similar to the case of the first selection signal, in response to the second selection signal, the switching block 550 selects the line L15b as the next one and the switching block 144 of the light beam detection unit 140 chooses the second photo-detector 142b as the next one.

At step S618, the process determines whether or not the sample surface scanning operation is completed. If the determination result is negative, the process proceeds to the step S620; and, if otherwise, it terminates the procedure. At step S620, the light beam scanner 120 will be put to a next position corresponding to the second next position signal inputted through the line L16 from the position signal generation block 510. Thereafter, the process returns to step S606 and repeats the steps described above.

As described above, in accordance with the present invention, the image representing the topography of the surface of the sample to be observed can be accurately obtained at high speed with high resolution, even in the presence of the impurities existing on the surface of the sample under the atmospheric pressure. Also, the components forming the scanning probe may be fabricated in one process to constitute one unit in a compact size so that the manufacturing cost of the atomic force microscope with plural scanning probes will be effectively reduced and the AFM has a simple structure even if it employs plural scanning probes. It should be noted that the components dimension forming the scanning probe are exaggerated on the drawings in behalf of a full understanding.

While the present invention has been described with respect to the particular embodiment, it will be apparent to those skilled in the art that various changes and modifications may be made without departing from the spirit and scope of the invention as defined in the following claims.

What is claimed is:

1. An atomic force microscope (AFM) capable of observing the topography of a sample surface at high speed with a high resolution under the atmospheric pressure, comprising:
a plurality of scanning probes for measuring the sample surface, wherein each of the scanning probes includes a cantilever having a tip and a first and a second actuator;
means for detecting a light beam reflected from said each of the scanning probes to convert same into a first signal in response to a second signal;
means for driving the scanning probes by generating a third and a fourth signal and detecting information regarding the topography of the sample surface;
means for emitting the light beam;
means for scanning the light beam to said each of the scanning probes under the control of the driving means; and
means for displaying thereon an image representing the topography of the sample surface,
wherein the first actuator performs a tapping operation in response to the third signal, the second actuator performs a positioning operation in response to the fourth signal and the frequency of the third signal is higher than that of the fourth signal,
wherein the driving means includes:
means for filtering the first signal to extract a frequency component different from the frequency component of the third signal, wherein the extracted frequency component is directly related to the information regarding the topography of the sample surface;
means for generating the third signal to provide same to the first actuator;
means for generating the fourth signal to provide same to the second actuator;
means for generating the second signal based on the first signal, in order to control the light beam scanning means; and
means for calculating a displacement of the cantilever moved in a normal direction with respect to the sample surface to generate a sixth signal bearing the information based on the extracted frequency component.

2. The AFM according to claim 1, wherein the light beam scanning means scans the light beam to said each of the scanning probes depending on the second signal generated from the driving means.

3. The AFM according to claim 2, wherein the tip is provided on a free end of the cantilever.

4. The AFM according to claim 3, wherein the driving means further includes:
means for generating a fifth signal based on the second signal; and
a switching block for selecting an output terminal connected to the second actuator of said each of the scanning probes, in response to the fifth signal, thereby providing the fourth signal to the second actuator.

5. The AFM according to claim 4, wherein the first and the second actuator are provided on the cantilever opposite to the free end thereof where the tip is provided.

6. The AFM according to claim 5, wherein the first actuator is arranged on the cantilever opposite to the second actuator.

7. The AFM according to claim 6, wherein the detecting means includes:
a plurality of photo-detectors for detecting and converting the light beam into the first signal; and
a multiplicity of signal amplifiers for amplifying the level of the first signal into a predetermined signal level,
wherein each of the photo-detectors is connected to at least one of the signal amplifiers.

8. The AFM according to claim 7, wherein the detecting means further includes a switching block for selecting one of the signal amplifiers in response to the fifth signal.

9. The AFM according to claim 8, wherein the calculation means computes a displacement corresponding to a deflection amount of the cantilever based on the extracted frequency component and the frequency component of the third signal to thereby generate the sixth signal, wherein the deflection of the cantilever is caused by the inter-atomic force between the tip and the sample surface to be observed.

10. The AFM according to claim 9, wherein the fourth signal drives the second actuator to perform a positioning operation, wherein the positioning operation restores a deflection state of the cantilever to an equilibrium state thereof at a measurement point on the sample surface without changing the current position of the cantilever.

11. The AFM according to claim 10, wherein the tapping operation is an operation in which the tip periodically comes in contact with and then off the sample surface with a constant time interval.

12. The AFM according to claim 11, wherein the image representing the topography of the sample surface is reconstructed based on the sixth signal.

13. The AFM according to claim 12, wherein the sixth signal corresponds to the deflection amount of the cantilever.

14. An atomic force microscope (AFM) capable of observing the topography of a sample surface at high speed with a high resolution under the atmospheric pressure, comprising:

a scanning probe matrix having N×M scanning probes thereon for measuring the sample surface, wherein each of the scanning probes includes a cantilever having a tip and a first and a second actuator, N and M being positive integers greater than 1, respectively;

means for detecting a light beam reflected from said each of the scanning probes to convert same into an electrical signal;

means for driving the scanning probes by generating a reference and a servo signal and detecting information regarding the topography of the sample surface;

means for emitting the light beam;

means for scanning the light beam to said each of the scanning probes under the control of the driving means; and means for displaying thereon an image representing the topography of the sample surface, wherein the first actuator performs a tapping operation in response to the reference signal, the second actuator performs a positioning operation in response to the servo signal and the frequency of the reference signal is higher than that of the servo signal, wherein the driving means includes:

means for filtering the electrical signal to extract a frequency component different from the frequency component of the third signal, wherein the extracted frequency component is directly related to the information regarding the topography of the sample surface;

means for generating the reference signal to provide same to the first actuator;

means for generating the servo signal to provide same to the second actuator;

means for generating a position signal based on the electrical signal, in order to control the light beam scanning means; and means for calculating a displacement of the cantilever moved in a normal direction with respect to the sample surface to generate a displacement signal bearing the information based on the extracted frequency component.

15. The AFM according to claim 14, wherein the light beam scanning means scans the light beam to said each of the scanning probes depending on the position signal.

16. The AFM according to claim 15, wherein the scanning probe matrix includes a same number of openings as the number of the scanning probes.

17. The AFM according to claim 16, wherein the width of each of the openings is determined by an incidence and a reflection angle of the light beam.

18. The AFM according to claim 17, wherein the tip is provided on a distal end of the cantilever.

19. The AFM according to claim 18, wherein the driving means further includes:

means for generating the selection signal based on the position signal; and a switching block for selecting an output terminal connected to the second actuator of said each of the scanning probes, in response to the selection signal, thereby providing the servo signal to the second actuator.

20. The AFM according to claim 19, wherein the first and the second actuator are provided on the cantilever opposite to the distal end thereof where the tip is provided.

21. The AFM according to claim 20, wherein the first actuator is arranged on the cantilever opposite to the second actuator.

22. The AFM according to claim 21, wherein the detecting means includes:

a plurality of photo-detectors for detecting the light beam and converting same into the electrical signal; and a multiplicity of signal amplifiers for amplifying the level of the electrical signal to a predetermined signal level, wherein each of the photo-detectors is connected to at least one of the signal amplifiers.

23. The AFM according to claim 22, wherein the detecting means further includes a switching block for selecting one of the signal amplifiers in response to the selection signal.

24. The AFM according to claim 23, wherein the calculation means computes a displacement corresponding to a deflection amount of the cantilever based on the extracted frequency component and the frequency component of the reference signal to thereby generate the displacement signal, wherein the deflection of the cantilever is caused by the inter-atomic force between the tip and the sample surface to be observed.

25. The AFM according to claim 24, wherein the servo signal drives the second actuator to perform a positioning operation, wherein the positioning operation restores a deflection state of the cantilever to an equilibrium state thereof at a measurement point on the sample surface without changing the current position of the cantilever.

26. The AFM according to claim 25, wherein the tapping operation is an operation in which the tip periodically comes in contact with and then off the sample surface with a constant time interval.

27. The AFM according to claim 26, wherein the image representing the topography of the sample surface is reconstructed based on the displacement signal.

28. The AFM according to claim 27, wherein the displacement signal corresponds to the deflection amount of the cantilever.

29. A method for driving an atomic force microscope (AFM) with plural scanning probes capable of observing the topography of a sample surface at high speed with a high resolution under the atmospheric pressure, comprising the steps of:

a) vibrating, responsive to a reference signal, a first actuator provided on each of the scanning probes;

b) detecting a deflection amount of a cantilever provided with a tip at its free end; and c) transmitting a servo signal to a second actuator based on the deflection amount of the cantilever, wherein the cantilever is provided on said each of the scanning probes and the first and second actuator are provided on the cantilever opposite to the free end where the tip is provided, wherein the step b) includes the steps of:
  b1) emitting a light beam toward a light beam scanner;
  b2) generating a position signal for locating the light beam scanner to a predetermined position where the light beam is directed to one of the scanning probes;
  b3) detecting the light beam reflected from the tip portion of the cantilever; and
  b4) converting the reflected light beam into an electrical signal to extract a frequency component thereof, wherein the extracted frequency component is different from the frequency component of the reference signal.

30. The method according to claim 29, wherein the extracted frequency component includes the information regarding the deflection of the cantilever.

31. The method according to claim 30, wherein the step c) includes the steps of:
  c1) calculating a frequency component difference between the extracted frequency component and the frequency component of the reference signal; and
  c2) generating the servo signal having a frequency corresponding to the calculated frequency component difference.

32. The method according to claim 31, wherein the calculated frequency component difference is directly related to the deflection amount of the cantilever.

33. The method according to claim 32, wherein the servo signal drives the second actuator to perform a positioning operation, wherein the positioning operation restores a deflection state of the cantilever to an equilibrium state thereof at a measurement point on the sample without changing the current position of the cantilever.

34. The method according to claim 33, wherein the first actuator is arranged on the cantilever opposite to the second actuator.

35. The method according to claim 34, wherein the first actuator performs a tapping operation in response to the reference signal, wherein the tapping operation is an operation in which the tip periodically comes in contact with and then off the sample surface with a constant time interval.

* * * * *